United States Patent
King et al.

(10) Patent No.: US 8,202,945 B2
(45) Date of Patent: *Jun. 19, 2012

(54) PROCESS FOR BROMINATING BUTADIENE/VINYL AROMATIC COPOLYMERS

(75) Inventors: Bruce A. King, Midland, MI (US);
David B. Gorman, Midland, MI (US);
John W. Hull, Jr., Midland, MI (US);
Daniel J. Murray, Midland, MI (US);
Terry L. Gehrman, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 333 days.

This patent is subject to a terminal disclaimer.

(21) Appl. No.: 12/375,679

(22) PCT Filed: Aug. 14, 2007

(86) PCT No.: PCT/US2007/018110
§ 371 (c)(1),
(2), (4) Date: Jan. 30, 2009

(87) PCT Pub. No.: WO2008/021417
PCT Pub. Date: Feb. 21, 2008

(65) Prior Publication Data
US 2010/0004402 A1 Jan. 7, 2010

Related U.S. Application Data

(60) Provisional application No. 60/838,087, filed on Aug. 16, 2006, provisional application No. 60/902,204, filed on Feb. 20, 2007.

(51) Int. Cl.
C08F 36/00 (2006.01)
C08F 32/00 (2006.01)
C08F 212/08 (2006.01)
C08F 8/30 (2006.01)
C08C 19/14 (2006.01)
C08L 9/00 (2006.01)
C08L 53/00 (2006.01)
B22C 1/22 (2006.01)

(52) U.S. Cl. ......... 525/331.9; 525/332.1; 525/332.9; 525/333.3; 525/333.4; 525/355; 525/86; 525/98; 525/232; 521/139; 526/335

(58) Field of Classification Search .......... 521/56, 521/139; 525/98, 86, 232, 221, 359.2, 331.9, 525/332.1, 332.9, 333.3, 333.4, 355; 526/335
See application file for complete search history.

(56) References Cited

U.S. PATENT DOCUMENTS

| | | | |
|---|---|---|---|
| 3,432,409 A * | 3/1969 | Schuler et al. | 205/431 |
| 5,543,452 A * | 8/1996 | Nakahashi et al. | 524/430 |
| 5,677,390 A | 10/1997 | Dadgar | |
| 5,686,358 A | 11/1997 | Choi | |
| 5,767,203 A | 6/1998 | Ao | |
| 6,232,393 B1 | 5/2001 | Dadgar | |
| 6,232,408 B1 | 5/2001 | Dadgar | |
| 6,235,831 B1 | 5/2001 | Reed | |
| 6,235,844 B1 | 5/2001 | Dadgar | |
| 2008/0287559 A1 * | 11/2008 | King et al. | 521/56 |

FOREIGN PATENT DOCUMENTS

| | | |
|---|---|---|
| EP | 359269 A | 3/1990 |
| GB | 383154 A | 11/1932 |
| WO | 99/55770 A | 11/1999 |

OTHER PUBLICATIONS

Buckles et al, "Spectrophotometric Study of Tetrabutylammonium Tribromide", Oct. 1951.
Conte et al., Mimicking the vanadium Bromoperoxidases Reactions . . , Tetrahedron Letters 35, 7429-7432 (1994).
Avramoff et al., "The Brominating Properties of Tetrametylammonium Tribromide", 1963.
Collado et al., "Nucleophilic 1,2 Addition of Bromine to Electron deficient double bonds by perbromide reagents", Tetrahedron 50, 6433-6440 (1994).
Muathen, "1,8 diazabicyclo[5.4.0]undec-7-ene hydrobromide perbromide . . . ", J. Org. Chem. 1992, 57, 2740-2741.
Bora et al., "Regioselctive Bromination of Organic Substrates . . . ", Org. Letters. 2000, 2, 247-249.
Buzdugan et al., "Bromination of Some Styrene-Diene Block Copolymers", Eur. Polym. J. 33, 1713-1716 (1997).

* cited by examiner

*Primary Examiner* — Ling Choi
*Assistant Examiner* — Monique Peets
(74) *Attorney, Agent, or Firm* — Gary C Cohn PLLC

(57) ABSTRACT

Butadiene copolymers are brominated using certain quaternary ammonium tribromides as the brominating agent. The bromination process proceeds easily under mild conditions, and produces a brominated product that has excellent thermal stability.

15 Claims, 1 Drawing Sheet

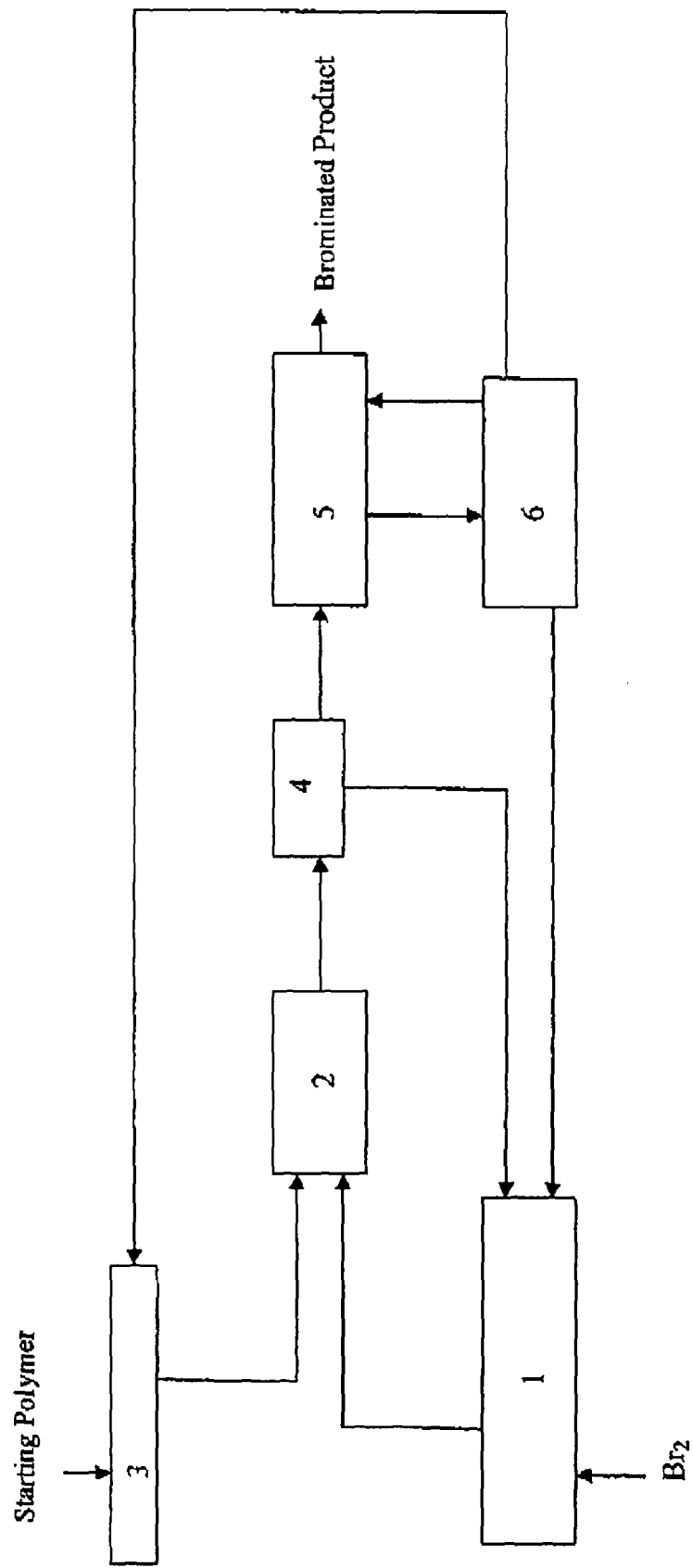

PROCESS FOR BROMINATING BUTADIENENINYL AROMATIC COPOLYMERS

This application claims benefit of U.S. Provisional Patent Applications 60/838,087, filed 16 Aug. 2006, and 60/902,204, filed 20 Feb. 2007.

The present invention relates to a process for brominating a butadiene copolymer, such as a brominated block, random or graft copolymer of styrene and butadiene.

Brominated compounds such as hexabromocyclododecane are commonly used as flame retardant (FR) additives for various polymer systems. FR additives increase the limiting oxygen index (LOI) of polymer systems, allowing articles made from those polymer systems to pass standard fire tests. Because hexabromocyclododecane is under regulatory and public pressure that may lead to restrictions on its use, there is an incentive to find a replacement for it. One candidate for replacing hexabromocyclododecane is a brominated polybutadiene polymer or copolymer.

A practical FR additive must possess sufficient thermal stability to undergo very little, preferably no, thermal degradation when subjected to melt processing conditions, during which the FR additive may be exposed to temperatures as high as 230 to 250° C. or higher. FR additives must possess other key characteristics as well, including compatibility with other polymers and other additives (notably foaming agents). In polymer foam applications, the FR additive should not have a significant adverse effect on the foaming process or on the produced foam, particularly on foam cell formation and foam cell size.

Brominated polybutadiene polymers and copolymers are known materials. The stability of these polymers at high temperatures tends to be inadequate for them to be used as FR additives in polymer systems. Often, significant degradation is seen when the brominated polybutadiene polymers are exposed to temperatures of 200° C. or even lower. Temperature stability to 230° C., and more preferably to 240° C. and still more preferably to 250° C. or higher is desired.

One method for brominating a polybutadiene homopolymer is described in French patent FR 1506872. Bromination is performed using elemental bromine with carbon tetrachloride and butyl alcohol as a solvent mixture. German patent DD 137308 describes the bromination of a "low viscosity" (3000 to 4000 centipoises) polybutadiene homopolymer using elemental bromine with carbon tetrachloride and methanol or ethanol as a reaction mixture.

Other processes have been used to brominate alkenes, dienes or polybutadiene. G. Dall' Asata et al., in *Die Makromolekulare Chemie*, 154, 279-290 (1972), describes using methylene chloride as a solvent, to avoid undesirable free radical reactions. H. Kawaguchi et al., in *Polymer*, 26, 1257-1264 (1985), describes bromination of a high cis-1,4-polybutadiene using dilute 1,2-dibromoethane in a mixture of methylene chloride and tetrahydrofuran (THF), at 0° C. and in the absence of oxygen. Ceausescu et al., in *J. Macromolecular Science-Chemistry*, A22 (5-7), 803-818 (1985), observes that brominated polybutadiene prepared with elemental bromine has poor thermal stability, and appears to release bromine and turn pink or brown even at room temperature. Ceausescu's observations refer to brominated polybutadiene having both low (5%) and high (60%) 1,2-isomer content.

Ammonium tribromides, such as pyridinium tribromide, are known to be mild and selective brominating agents. See, e.g., *Advanced Organic Chemistry* (March, 2 Edition, 1977), p. 741. The ammonium tribromides tend to be solid materials and are easier to handle than elemental bromine. Other ammonium tribromides that have been used in bromination reactions include tetramethylammonium bromide (*Journal of Organic Chemistry*, 28, 3256 (1963)), phenyltrimethylammonium tribromide (*Chem. Letters*, page 627 (1987); *Tetrahedron*, 50, page 6433 (1994)), cetyltrimethylammonium tribromide and tetrabutylammonium tribromide (*Journal of the American Chemical Society* (JACS), 73, page 4525 (1951), and 1,8-diazabicyclo[5,4,0]-tetrabutylammonium tribromide (*Journal of Organic Chemistry*, 57, page 2740 (1992)). A recyclable tribromide reagent 1,2-dipyridiniumtribromide-ethane (DPTBE) has been reported as a mild and efficient brominating agent under solvent free conditions that can be recovered and reused. See *Journal of Organic Chemistry*, 70, page 4267 (2005).

*Tet Letters*, 35, 7429-7432 (1994) reports a mild and selective bromination in a two phase system involving an aqueous phase and an organic substrate. The aqueous phase contains hydrogen peroxide, catalytic amounts of ammonium metavanadate ($NH_4VO_3$), and potassium bromide. The organic substrate or double bond containing compound is dissolved in chloroform. The bromination reportedly gives greater than 98% yields for dibromides of terminal olefins.

The present invention is in one aspect a process comprising subjecting a reaction mixture including a) at least one phenyltrialkylammonium tribromide, benzyltrialkylammonium tribromide or tetraalkylammonium tribromide, b) at least one butadiene/vinyl aromatic copolymer containing from 5 to 90 percent by weight of polymerized vinyl aromatic monomer units from 10 to 95 percent by weight of polymerized butadiene units, and a weight average molecular weight of at least 1000 and c) at least one solvent for the butadiene/vinyl aromatic copolymer, to conditions sufficient to brominate at least 50 percent of non-aromatic double bonds in the butadiene/vinyl aromatic copolymer.

In another aspect, this invention is a process comprising blending bromine with a reaction mixture containing a) at least one phenyltrialkylammonium monobromide salt, benzyltrialkylammonium monobromide salt or tetraalkylammonium monobromide salt, b) at least one butadiene/vinyl aromatic copolymer containing from 5 to 90 percent by weight of polymerized vinyl aromatic monomer units and from 10 to 95% percent by weight of polymerized butadiene units, and a weight average molecular weight of at least 1000 and c) at least one solvent for the butadiene/vinyl aromatic copolymer, and subjecting the resulting blend to conditions sufficient to brominate at least 50 percent of non-aromatic double bonds in the butadiene/vinyl aromatic copolymer.

In another aspect, this invention is a process comprising blending bromine with a reaction mixture containing a) at least one phenyltrialkylammonium monobromide salt, benzyltrialkylammonium monobromide salt or tetraalkylammonium monobromide salt, b) at least one butadiene/vinyl aromatic copolymer containing from 5 to 90 percent by weight of polymerized vinyl aromatic monomer units and from 10 to 95 percent by weight of polymerized butadiene units, and a weight average molecular weight of at least 1000 and c) at least one solvent for the butadiene/vinyl aromatic copolymer, said blending step being performed under conditions sufficient to brominate non-aromatic double bonds in the butadiene/vinyl aromatic copolymer.

In another aspect, this invention is a process comprising continuously or intermittently blending bromine with a reaction mixture containing a) at least one phenyltrialkylammonium monobromide salt, benzyltrialkylammonium monobromide salt or tetraalkylammonium monobromide salt, b) at least one butadiene/vinyl aromatic copolymer containing from 5 to 90 percent by weight of polymerized vinyl aromatic monomer units and from 10 to 95 percent by weight of polymerized butadiene units, and a weight average molecular weight of at least 1000 and c) at least one solvent for the butadiene/vinyl aromatic copolymer, said continuous or intermittent blending step being performed under conditions sufficient to brominate non-aromatic double bonds in the butadiene/vinyl aromatic copolymer.

The bromination processes of the various aspects of the invention offer several advantages, including facile and rapid bromination under mild conditions; excellent selectively towards bromination of aliphatic carbon-carbon double bonds with little or no bromination of aromatic rings in the polymer, and good bromination of 1,2-butadiene units in the polymer. In addition, the brominated polymers tend to exhibit excellent thermal stability, as indicated by a thermal gravimetric analysis (TGA) method described below. Brominated polymers made in accordance with the invention often exhibit 5% weight loss temperatures, determined according to the TGA method described below, of above 200° C., more typically above 230° C., often above 240° C. and in some cases 250° C. or more. Certain aspects of the invention lend themselves easily to continuous or semi-continuous operation. Another advantage of the invention is that solvents such as halogenated alkanes, cyclic alkanes that contain no hydrogen atoms bonded to a tertiary carbon atom and halogenated aromatic compounds are usually suitable; the use of these solvents eliminates the formation of ether groups on the polymer, as sometimes occurs when oxygenated solvents are used. Surprisingly, little halogen exchange seems to occur between the solvent and the brominated polymer when a halogenated solvent is used, except under certain cases when elevated temperatures above 80° C. are used.

The FIGURE is a diagram of an embodiment of a continuous process in accordance with the invention.

The butadiene/vinyl aromatic copolymer starting material is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as, for example alpha-methylstyrene), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" refers to repeating units in the starting material that are formed when a vinyl aromatic monomer is polymerized. The starting copolymer contains from 5 to 90 percent by weight of polymerized vinyl aromatic monomer units.

The butadiene/vinyl aromatic copolymer contains at least 10% by weight of polymerized butadiene. Butadiene polymerizes to form two types of repeating units. One type, referred to herein as "1,2-butadiene units" takes the form

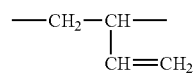

and so introduce pendant unsaturated groups to the polymer. The second type, referred to herein as "1,4-butadiene" units, take the form —$CH_2$—CH=CH—$CH_2$—, introducing unsaturation into the main polymer chain. The butadiene/vinyl aromatic polymer contains at least some 1,2-butadiene units. Of the butadiene units in the butadiene/vinyl aromatic polymer, at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the butadiene/vinyl aromatic copolymer. The proportion of 1,2-butadiene units may be in excess of 85% or even in excess of 90% of the butadiene units in the copolymer. For convenience, copolymers in which the 1,2-butadiene units constitute at least 50% of the total amount of butadiene units are sometimes referred to herein as "high 1,2-butadiene copolymers".

Methods for preparing butadiene/vinyl aromatic polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules*, 6, 129-133 (1973), and H. Ashitaka, et al., in *J. Polym. Sci. Polym. Chem.* 21, 1853-1860 (1983).

The butadiene/vinyl aromatic copolymer may be a random, block (including multiblock such as diblock or triblock types) or graft type of copolymer. Styrene/butadiene block copolymers are widely available in commercial quantities. Those available from Dexco Polymers under the trade designation VECTOR™ are suitable. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

The butadiene/vinyl aromatic polymer may also contain repeating units formed by polymerizing monomers other than butadiene and the vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the vinyl aromatic monomer and/or butadiene, may be polymerized to form blocks, or may be grafted onto the butadiene/vinyl aromatic copolymer.

The butadiene/vinyl aromatic copolymer has a weight average molecular weight ($M_w$) within a range of from 1,000 to 400,000, preferably from 2,000 to 300,000, more preferably from 5,000 to 200,000 and even more preferably, at least from a commercial availability point of view, from 50,000 to 175,000. For purposes of this invention, molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 ml/min and heated to a temperature of 35° C. as the eluent.

The most preferred type of butadiene/vinyl aromatic copolymer is a block copolymer containing one or more polystyrene blocks and one or more polybutadiene blocks. Among these, block copolymers having a central polybutadiene block and terminal polystyrene blocks are especially preferred.

The bromination reaction is conducted in the presence of a solvent for the butadiene/vinyl aromatic copolymer. Suitable solvents include ethers such as tetrahydrofuran; halogenated alkanes such as carbon tetrachloride, chloroform, dichloromethane, bromochloromethane and 1,2-dichloroethane; hydrocarbons such as cyclohexane, cyclopentane, cyclooctane and toluene, and halogenated aromatic compounds such as bromobenzene, chlorobenzene and dichlorobenzene. Preferred solvents have boiling temperatures (at atmospheric pressure) of less than 100° C. (especially less than 80° C.), are substantially immiscible in water, are aprotic, and do not contain either hydrogen atoms bonded to a tertiary carbon atom or oxygen. Halogenated and hydrocarbon solvents are therefore preferred over oxygen-containing solvents. It has been found that halogen exchange reactions do not occur to a significant extent when mild reaction conditions are used, and for that reason chlorinated solvents are very suitable for use in the invention. Halogenated alkanes, cyclic alkanes that contain no hydrogen atoms bonded to a tertiary carbon atom and halogenated aromatic compounds are particularly preferred solvents. Especially preferred solvents are more volatile than water, and are thus easily removed from water. Two especially preferred solvents are dichloroethane and cyclohexane.

The brominating agent is a phenyltrialkylammonium tribromide, benzyltrialkylammonium tribromide or a tetraalkylammonium tribromide. Examples of these include phenyltrimethylammonium tribromide, benzyltrimethylammonium tribromide, tetramethylammonium tribromide, tetraethylammonium tribromide, tetrapropylammonium tribromide, tetra-n-butylammonium tribromide and the like.

The tribromide brominating agent can be prepared by mixing the corresponding quaternary ammonium monobromide salt with elemental bromine. The monobromide salt is usually water-soluble, so a convenient way of making the tribromide is to add elemental bromine to an aqueous solution of the monobromide salt. This reaction occurs well at approximately room temperature, but higher or lower temperatures can be used if desired. The tribromide tends to precipitate from the aqueous phase, and so may be recovered from the liquid phase by any convenient solid-liquid separation method. The tribromide is soluble in organic solvents such as the chlorinated solvents described above, and may be dissolved in such a solvent if desired to facilitate blending with the butadiene/vinyl aromatic copolymer and the bromination solvent.

In addition, the tribromide may be formed in situ in the presence of the solvent and/or butadiene/vinyl aromatic copolymer, as described more fully below. This process has the advantage of using less of the expensive compound that serves to carry the bromine added to the polymer and is preferred.

The reaction is conducted by mixing the butadiene/vinyl aromatic copolymer, solvent and quaternary ammonium tribromide together and allowing the mixture to react until the desired proportion of butadiene units have been brominated. The order of addition is not especially important, except that if the tribromide and butadiene/vinyl aromatic copolymer are mixed first, it is preferred to add the solvent before significant reaction occurs.

The solvent is used in quantities sufficient to dissolve the butadiene/vinyl aromatic copolymer under the conditions of the reaction. The concentration of the copolymer in the solvent may range from, for example, 1 to 50% by weight, especially from 5 to 35% by weight. About 0.5 to about 5 moles of the tribromide brominating agent are suitably used per mole of butadiene units in the copolymer; a more suitable amount is from about 0.9 to about 2.5 moles/mole and an even more suitable amount is from 1 to 1.5 moles/mole.

Generally, only mild conditions are needed to effect the bromination. Bromination temperatures can range from −20 to 100° C., and are preferably from 0 to 85° C. and especially from 10 to 40° C. Temperatures higher than 100° C. could be used, but are not necessary and may lead to a loss of selectivity and/or an increase in by-products. The tribromide becomes converted to the corresponding quaternary ammonium monobromide salt as the reaction proceeds.

The time of the reaction is sufficient to achieve the desired amount of bromination. Typically, bromination occurs on at least 25% of the butadiene units in the copolymer. More preferably, at least 50% and more preferably at least 70% and even more preferably at least 80% of the butadiene units are brominated. Up to 100% of the butadiene units can be brominated. Preferably up to 95% or up to 99% of the butadiene units are brominated. The extent of bromination can be determined using proton NMR methods. Residual double bond percentage, polymerized styrene monomer content and 1,2 isomer content can be determined by comparing integrated areas of signals due to appropriate protons (residual double bond protons are between 4.8 and 6 ppm) (relative to tetramethylsilane (TMS)), styrene aromatic protons are between 6.2-7.6 ppm, and protons for brominated polybutadiene are between 3.0 and 4.8 ppm). A Varian INOVA™ 300 NMR spectrometer or equivalent device is useful for such determinations, being operated with a delay time of 30 seconds to maximize relaxation of protons for quantitative integrations. A deutero-substituted solvent such as deutero-chloroform or d5-pyridine is suitable for diluting the sample for NMR analysis.

Residual double bonds in the brominated polymer can lead to undesirable cross-linking reactions, particularly when the brominated copolymer is blended with another polymer such as a polyvinyl aromatic polymer for manufacture of extruded articles (foam, film, fiber, moldings etc.). The crosslinking may lead to gel formation and fouling of processing equipment. The presence of gels may lead to impaired physical properties, blemished surface or optical properties, or increased color formation. Gels may affect the ability to melt-process the blends, particularly when the blends are foamed.

Depending on the particular solvent and the particular copolymer, the copolymer may become less soluble in the reaction mixture as the copolymer becomes brominated, and may precipitate from the reaction mixture. In some cases quaternary ammonium monobromide salts that form during the reaction may precipitate from the reaction mixture.

In certain embodiments of the invention, the quaternary ammonium tribromide is formed in situ in the reaction mixture by separately adding elemental bromine and the corresponding quaternary ammonium monobromide salt. It is believed that the bromine and monobromide salt form the tribromide upon being mixed together, with the resulting tribromide then reacting with the butadiene/vinyl aromatic copolymer to brominate the copolymer and regenerate the monobromide salt. As elemental bromine is consumed in this reaction sequence, more bromine may be added to the reaction mixture continuously or intermittently to reproduce the tribromide and maintain the reaction.

The ability to form the quaternary ammonium tribromide in situ lends itself to the operation of a continuous or semi-continuous process, in which elemental bromine is fed into a reaction mixture continuously or in any number of stages, as the tribromide is consumed in the reaction and the monobromide salt is regenerated. The elemental bromine combines with the regenerated monobromide salt to re-form the tribromide. A semi-continuous or continuous process is also favored when there is a large solubility difference between the brominated copolymer and the quaternary ammonium monobromide salt. For example, if the brominated copolymer is insoluble or only slightly soluble in the solvent used in the bromination reaction, but the monobromide salt is soluble in the solvent, conditions can be selected such that the brominated polymer precipitates as it is formed while the monobromide salt-remains in solution. Under such conditions, fresh starting polymer can be continuously or intermittently introduced to the reaction zone as brominated polymer precipitates. Thus, in an especially preferred process, fresh starting copolymer and elemental bromine are added continuously or intermittently to a reaction zone that contains solvent and the quaternary ammonium monobromide salt, and the brominated polymer either precipitates from the reaction mixture, or is otherwise continuously or intermittently removed therefrom. The precipitated brominated copolymer is easily removed from the reaction mixture by solid/liquid separation methods.

Alternatively the monobromide salt may precipitate from the reaction solution while the brominated polymer remains dissolved. An example of such a case is when tetraethylammonium monobromide is used as the quaternary ammonium monobromide salt and either 1,2-dichloroethane or methylene chloride are used as the solvent. A continuous process that takes advantage of these solubility attributes includes recycling the precipitated quaternary ammonium monobromide salt back through the process (either as a slurry or as an aqueous solution) to regenerate the soluble tribromide. The soluble polymer can be isolated from the process solution via steam stripping or precipitation using an antisolvent. As before, starting polymer and bromine can be added continuously or intermittently to the reaction mixture to continuously regenerate the quaternary ammonium tribromide.

Suitable equipment for conducting some specific continuous process schemes is diagrammed in FIG. 1. In FIG. 1, the process equipment includes tank 1 which contains aqueous tetraethylammonium monobromide, continuous reactor 2, holding tank 3 for dissolved polybutadiene copolymer, filtration device 4, and precipitator or devolatilizer 5. Tetraethylammonium monobromide is continuously recycled through the process by adding bromine into tank 1 (or into the conduit connecting tank 1 with continuous reactor 2) to generate tetraethylammonium tribromide, which is insoluble in water, but soluble in the reaction solvent. The reaction solvent is continuously fed to tank 1 to dissolve the tetraethylammonium tribromide, which is siphoned off as a steady stream that is introduced into continuous reactor 2. Along with the dissolved tetraethylammonium tribromide solution, dissolved butadiene copolymer also is added continuously from holding tank 3 to continuous reactor 2. The tetraethylammonium tribromide and butadiene copolymer streams are mixed and continue through continuous reactor 3. As tetraethylammonium monobromide reforms in continuous reactor 3, it precipitates from solution, causing the reaction mixture to become a slurry. Filter 4 diverts the solids back into tank 1, while the dissolved brominated polymer passes through filter 4 on to precipitator or devolatilizer 5, where solvent is recovered, distilled in distillation unit 6 and recycled back to the tank 1 and holding tank 3.

Tetrabutylammonium tribromide can also be used as the brominating agent in such a process. In that case, it is the brominated polymer rather than the regenerated tetrabutylammonium bromide that precipitates from solution. In this case, therefore, polymer solids are removed at filter 4 and sent to a concentrator unit 5, which separates polymer solids from solvent. A concentrated solution of tetrabutylammonium monobromide is returned to tank 1 for regeneration to the tribromide.

Alternatively, tank 1 can hold a slurry of tetraethylammonium monobromide in the reaction solvent (rather than an aqueous solution as just described). As reaction solvent is recycled from distillation unit 6 to tank 1, tetraethylammonium monobromide solids are recycled from filter 4 to tank 1 and bromine is added to tank 1, tetraethylammonium tribromide is formed. As the tribromide is soluble in the reaction solvent, a slurry is formed in tank 1. The slurry includes a supernatant liquid that contains dissolved tetraethylammonium tribromide. The supernatant liquid is provided to continuous reactor 2 as the source of tetraethylammonium tribromide for the reaction. Again, tetrabutylammonium tribromide can be used as the brominating agent in such a process. The polymer precipitates rather than the tetrabutylammonium monobromide. In this case, therefore, polymer solids are removed at filter 4 and sent to a concentrator unit 5, which separates polymer solids from solvent. A concentrated solution of tetrabutylammonium monobromide is returned to tank 1 for regeneration to the tribromide.

In some embodiments, the quaternary ammonium monobromide salt is affixed to a solid support, and the tribromide is generated at the surface of the support. The starting polymer is then passed in contact with the support under reaction conditions to effect the bromination.

Under the conditions described above, the bromination reaction tends to be highly selective, in several respects. Little or no bromination occurs on the aromatic rings. Otherwise, bromination tends to take place at the carbon-carbon double bonds of both 1,2- and 1,4-butadiene units, and bromination tends to take place so that little bromination occurs at tertiary carbon atoms. It is believed that the bromination occurs through an ionic mechanism, rather than a free radical mechanism that tends to introduce unwanted bromine at tertiary carbon atoms. These tertiary bromines are believed to adversely affect the temperature stability of the brominated copolymer.

In cases in which the brominated polymer is insoluble in the reaction mixture, the product can be recovered using any convenient solid/liquid separation method such as filtration, decantation or the like. If the brominated polymer remains soluble in the reaction mixture, it is conveniently isolated from the mixture through a suitable method such as distillation of the solvent, or addition of an anti-solvent which causes the brominated copolymer to become insoluble and precipitate. Examples of such anti-solvents include lower alcohols such as methanol, ethanol and 1-propanol, 2-propanol, n-butanol, and t-butanol.

The isolated polymer may be purified to remove residual bromine, brominating agent, solvent and by-products as desired or needed for a particular application. Bromide salts may be removed by passing the polymer through silica gel or an ion exchange resin bed. The polymer may be washed with an aqueous sodium hydrogen sulfite solution to neutralize or quench unreacted brominating agent that may be present. This effectively removes or eliminates any orange color that may be present in the polymer due to residual bromine or bromine compounds.

The process of the invention tends to produce brominated copolymer products that have excellent thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (ml/min) flow of gaseous nitrogen and a heating rate of 10° C./min over a range of from room temperature (nominally 2.5° C.) to 600° C. The mass lost by the sample is monitored during the heating step, and the temperature at which the sample has lost 5% of its initial weight is designated the 5% weight loss temperature (5% WLT). This method provides a temperature at which a sample undergoes a cumulative weight loss of 5 wt %, based on initial sample weight. The brominated copolymer preferably exhibits a 5% WLT of at least 200° C. The 5% WLT is preferably at least 220° C., more preferably at least 230° C., even more preferably at least 240° C., and still more preferably at least 250° C. Brominated copolymers in which at least 85% of the butadiene units have been brominated, and which have such 5% WLT values, are of particular interest.

A further increase in thermal stability is sometimes seen if the brominated copolymer is treated with an alkali metal base. The alkali metal base may be, for example, a hydroxide or a carbonate. The alkali metal base is preferably an alkali metal alkoxide, as the alkali metal alkoxides tend to provide more of an increase in thermal stability than do some other bases, such as alkali metal hydroxides, carbonates or carboxylates. In some cases, an increase in 5% WLT of from 3 to 12° C. or more is seen when the brominated copolymer is treated with an alkali metal alkoxide. Increases in 5% WLT of from 1 to 6° C. are typically seen with treatment with alkali metal hydroxides, alkali metal carbonates and alkali metal carboxylates.

The alkali metal can be lithium, sodium, potassium or cesium. Lithium, sodium and potassium are preferred.

The base is an alkali metal alkoxide in preferred embodiments. The alkoxide ion can contain from 1 to 8, preferably from 1 to 4, carbon atoms, with methoxide and ethoxide being especially preferred. Especially preferred alkali metal alkoxides are lithium methoxide, sodium methoxide, potassium methoxide, lithium ethoxide, sodium ethoxide and potassium ethoxide.

The brominated copolymer can be treated with as little as 0.01 mole of the alkali metal base, per mole of polymerized butadiene units in the copolymer (whether brominated or unbrominated). There is no upper limit on the amount of alkali metal base, although cost and handling considerations mitigate against using more than about 1 mole of the alkali metal base per mole of polymerized (brominated or unbrominated) butadiene units in the copolymer. A preferred amount is from 0.03 to 0.50 moles/mole of polymerized (brominated or unbrominated) butadiene units, and an especially preferred amount is from 0.05 to 0.20 moles/mole.

The alkali metal base can be added at various stages of the bromination and subsequent product recovery process. For example, the alkali metal base may be present during the bromination reaction, in this case being added prior to, simultaneously with or after the brominating agent is introduced to the starting copolymer. In this case, the alkali metal base (or its decomposition or reaction products) are carried along with the copolymer through at least the initial product recovery steps. The alkali metal base (or its decomposition or reaction products) may be removed during downstream recovery processes such as washing and precipitation from the solvent.

It is more preferred to introduce the alkali metal base after the bromination reaction is completed, while the brominated copolymer is in solution. In a preferred process, the brominated copolymer solution is first separated from the aqueous phase (if any) that is present and the copolymer solution is then contacted with the alkali metal base. The alkali metal base can be added in several ways. It can be added to the brominated copolymer as a finely divided solid, in which case the mixture should be agitated well to provide good contact of the alkali metal base with the copolymer solution.

The alkali metal base can be added a solution in an appropriate solvent, such as methanol, ethanol or 2-propanol, which preferably is miscible with the brominated copolymer solution. If the solvent for the alkali metal base is an antisolvent for the brominated copolymer, the treatment step can be combined with the precipitation of the copolymer from solution. The alkali metal base or a solution thereof can be added as a solution or a mixture in water, in which case, again, good mixing will be needed to ensure contact of the base with the brominated copolymer. It is noted that the preferred alkali metal hydroxides will hydrolyze in water to form a complex mixture of alkoxide, the corresponding alkali metal hydroxide, and an alcohol corresponding to the alkoxide ion. Thus, it is believed that in this case the brominated copolymer is in effect being treated with a mixture of the alkali metal alkoxide and the corresponding alkali metal hydroxide.

The copolymer may then be recovered from the solution by precipitation as described before, or other convenient method (if it is not precipitated simultaneously with the alkali metal base treatment). The treated copolymer may be washed one or more times before precipitating the copolymer, in order to remove decomposition and/or reaction products of the alkali metal base. One or more washes with water or dilute aqueous acid is suitable for this purpose. These washes can be done simultaneously with or following the alkali metal base treatment.

The temperature during the alkali metal base treatment can be, for example, from −10° C. to 100° C., and is preferably from about 10° C. to about 60° C. The alkali metal base needs only to be in contact with the copolymer for a short period of time, typically on the order of a few minutes or even less, to be effective.

It is also possible to treat the brominated copolymer after it has been recovered from a solvent used in the bromination step. In such a case, the alkali metal base can be added as a solution in a solvent that swells or dissolves the copolymer. Alternatively, the alkali metal base can be added (optionally as a solution) to a melt of the brominated copolymer. The treated brominated copolymer can then be washed as described before.

If desired, a material such as sodium gluconate or sodium sulfite may be added to the crude brominated copolymer solution prior to adding the alkali metal base. This is conveniently performed by adding the material as a solution in water or other solvent which is substantially immiscible with the solvent for the copolymer. This material may be removed from the brominated copolymer, preferably by separation of the immiscible phases, prior to adding the alkali metal base to the copolymer solution.

The brominated copolymer is useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated copolymer is soluble or can be dispersed to form domains of less than 10 µm, preferably less than 5 µm, in size. Enough of the brominated copolymer is preferably present in the blend to provide the blend with a bromine content within a range of from 0.1 percent by weight to 25 percent by weight, based upon blend weight.

Blends of the brominated copolymer may include other additives such as other flame retardant additives, flame retardant adjuvants, thermal stabilizers, ultraviolet light stabilizers, nucleating agents, antioxidants, foaming agents, acid scavengers and coloring agents.

The following examples are provided to illustrate the invention, but not to limit the scope thereof. All parts and percentages are by weight unless otherwise indicated.

EXAMPLE 1

To a 3-L round-bottom flask equipped with overhead stirring, condenser, and a nitrogen inlet are added 99.0 g of styrene-butadiene triblock copolymer containing terminal polystyrene blocks that each constitute 20% by weight of the block copolymer, and a central polybutadiene block constituting 60% by weight of the polymer. This amount of polymer provides approximately 1.1 mol of butadiene units. 530.6 g of tetrabutylammonium tribromide (TBAT) (Sigma-Aldrich Lot 06219AD, 1.10 mol), and 1355 g of dichloromethane (16.0 mol) are also added to the flask. The mixture is heated to reflux (~40° C.) with stirring for 5 hours in a warm water bath, after which stirring is ceased and the mixture allowed to cool slowly to room temperature. At least some of the brominated polymer precipitates from solution. The supernatant liquid is decanted away from the solids. The precipitated polymer is dissolved in 2003 g (23.58 mol) of dichloromethane and was sent through 250 g of 230-400 mesh silica gel packed in a column 3" (7.5 cm) high and 3.5" (8.8 cm) in diameter and wetted with dichloromethane to provide a uniform bed. The polymer solution elutes after 5 hours under ambient conditions followed by 1 hour of applying gentle nitrogen pressure to the column, and the column is then rinsed with 422 g of dichloromethane. A total of 2864 g of faint yellow eluent is collected. The filtrate is divided into two portions of 1434 g and 1430 g.

2369 g of 2-propanol is placed into a 5-L round bottom flask equipped with overhead stirring, an addition funnel, and a nitrogen inlet. The 1434-g portion of filtrate is added via the addition funnel over 3-4 minutes, followed by a small rinse of 66 g dichloromethane. A slurry forms as the brominated polymer precipitates. The slurry is filtered on a 2-L coarse glass-fritted funnel. The 1430-g sample of filtrate is treated in the same manner, using slightly less dichloromethane rinse. The filtrates from the two precipitations are combined and washed with 795 g of 2-propanol. The wet cake (495 g) is transferred to a drying dish and is dried under ambient conditions for 5 days in a fume hood, yielding 224.5 g of brominated copolymer as a bright white powder.

The product brominated copolymer is found to contain 3.3 ppm free bromide by ion chromatography. Proton NMR (using the procedure described before), indicates the presence of no detectable tetrabutylammonium bromide salt. Proton NMR also indicates that 82% of the butadiene units in the polymer are brominated. Weight average molecular weight is 135,830 when measured by GPC as described above. Number average molecular weight is 131,200 by the same method, resulting in a polydispersity of 1.035. 5% WLT, measured by TGA as described before, is ~259° C.

EXAMPLE 2

4 g of the styrene/butadiene block copolymer described in Example 1, 20.3 g of tetrabutylammonium tribromide (0.042 mol) and 70 ml dichloromethane are added to a 250 mL 3-necked flask equipped with a: mechanical stirrer and a thermocouple to prepare a stirred solution. The mixture is heated at reflux for 4 hours and cooled to room temperature. 30 mL of toluene is then added to the flask followed by 50 mL of water. The water phase is separated and the product washed with 50 mL of aqueous sodium chloride solution (25% wt/wt) containing 1 g of sodium hydrogen sulfite per 100 mL of solution. The product is again washed with 50 mL of 25% sodium chloride solution. The brominated copolymer is precipitated by mixing the resulting polymer solution with five times its volume of methanol. The precipitated polymer is separated by filtration and dried overnight in a vacuum oven operating at a set point temperature of 70° C.

The brominated copolymer is re-dissolved in 100 mL toluene, washed with 50 mL water to remove any residual tetrabutylammonium bromide by-product, and again isolated by precipitation in methanol as before. The brominated polymer is again separated by filtration and dried overnight as before.

Proton NMR also indicates that 88% of the butadiene units in the polymer are brominated. Weight average molecular weight is 139,800 when measured by GPC as described above. Number average molecular weight is 136,100 by the same method, resulting in a polydispersity of 1.03. 5% WLT, measured by TGA as described before, is 260° C.

EXAMPLE 3

To a 500-mL round-bottom flask equipped with overhead stirring, condenser, and a nitrogen inlet are added 9.0 g of the styrenelbutadiene polymer described in Example 1, 38.7 g (0.12 mol) of tetrabutylammonium bromide and 120 g (16.0 mol) of dichloromethane. To the mixture is added 16.0 g (10 mol) of bromine over 20 min, which results in an increase in the pot temperature from 20 to 26° C. The reaction mixture is heated to reflux for 6 hours in a warm water bath and then allowed to cool to room temperature overnight. A portion of the brominated copolymer precipitates to form a slurry, which is concentrated using a rotary evaporator at 60° C./20 mm Hg (2.66 kPa) to produce 120 g of an orange mixture. The mixture is filtered through a coarse glass-fritted funnel, to produce yellow pellet-like solids. The solids are washed with 50 mL of 2-propanol and are dried, and then redissolved in 171 g of dichloromethane. The solution is passed through 28 g of 230-400 mesh silica gel which is pre-wetted with 43 g of dichloromethane. The silica gel column is rinsed with 52 g of dichloromethane, which is combined with the eluent from the copolymer solution. The combined eluent is added to an addition funnel and diluted with 117 g of dichloromethane to form ~250 mL of copolymer solution. The copolymer solution is added over 3 minutes to a 3-L round bottom flask containing 397 g (500 mL) of rapidly stirring 2-propanol. The resulting slurry is filtered, and the solids are washed with 40 g of 2-propanol. The solids are then tumble-dried using a rotary evaporator at 65° C./20 mm Hg (2.66 kPa) for over 2 hours, to yield 19.5 g of bright white powdery solids.

Proton NMR also indicates that 71% of the butadiene units in the polymer are brominated. Weight average molecular weight is 144,640 and number average molecular weight is 140,140. Polydispersity is 1.03. 5% WLT is ~260° C.

EXAMPLE 4

To a 1-L round-bottom flask equipped with overhead stirring, condenser, and a nitrogen inlet are added 9.0 g of the styrene/butadiene copolymer described in Example 1, 26.3 g (0.125 mol) of tetraethylammonium bromide and 164 g (16.0 mol) of dichloromethane. The mixture is cooled to 1° C. and 16.0 g (0.10 mol) of bromine is added over 7 minutes. This causes the pot temperature to increase to 4° C. The reaction mixture is heated to reflux for 6.5 hours in a warm water bath before allowing the mixture to cool to room temperature overnight. The resulting slurry is concentrated using a rotary evaporator at 60° C./20 mm Hg (2.66 kPa) to yield 62 g of orange solids. The solids are transferred to a 500-mL separatory funnel, using 289 g of dichloromethane and 108 g of water to aid the transfer and to dissolve the solids. A two-phase mixture forms. After mixing thoroughly, the lower layer is added to a 2-L round bottom flask containing 787 g of rapidly stirring acetonitrile. The resulting slurry is filtered, washing the solids with 148 g of acetonitrile. The solids are tumble-dried in a 1-L round bottom flask using a rotary evaporator at 65° C./20 mm Hg (2.66 kPa) for 2 hours to yield 22.1 g of bright white powdery solids.

Proton NMR also indicates that 88% of the butadiene units in the polymer are brominated. Weight average molecular weight is 136,740 and number average molecular weight is 130,720. Polydispersity is 1.05. 5% WLT is ~244.5° C.

EXAMPLE 5

To a 500-mL round-bottom flask equipped with overhead stirring, addition funnel, and a nitrogen inlet are added 9.0 g of the styrene/butadiene copolymer described in Example 1 and 165 g (1.95 mol) of dichloromethane. After the solids dissolve, the solution is cooled to 3° C. To the addition funnel are added 38.5 g (0.12 mol) of tetrabutylammonium bromide and 39.5 g of deionized water. 15.9 g (0.10 mol) of bromine is added to the solution, producing rust red solids. The solids are dissolved by adding 64.8 g of dichloromethane, resulting in a two-phase liquid system. The lower deep red layer is added to the reaction mixture in the round-bottom flask over 7 minutes, raising the pot temperature to 4° C. The resulting murky orange mixture is stirred at ambient conditions over a weekend. The resulting mixture is diluted with 97 g of toluene, and then concentrated on a rotary evaporator to 148 g of a slurry. The slurry is transferred to a 500-mL separatory funnel, using 61 g of toluene and 102 g of water to aid the transfer and to dissolve the solids. A two-phase mixture forms. After mixing thoroughly, the lower aqueous layer is removed and the upper organic layer is extracted with 51 g of water. The washed organic solution is added over 1 minute to a 2-L round bottom flask containing 503 g of rapidly stirring methanol. The resulting slurry is filtered, and the solids are washed with 160 g of methanol. The washed solids are tumble-dried in a 1-L round bottom flask using a rotary evaporator at 65° C./20 mm Hg (2.66 kPa) for 2 hours to yield 20.9 g of dull white solids.

Proton NMR also indicates that 91% of the butadiene units in the polymer are brominated. Weight average molecular weight is 129,230 and number average molecular weight is 125,570. Polydispersity is 1.03. 5% WLT is ~255° C.

EXAMPLE 6

To a 500-mL round-bottom flask equipped with overhead stirring, addition funnel, and a nitrogen inlet are added 9.0 g of the styrene/butadiene copolymer described in Example 1 (0.1 mol eq. of polybutadiene) and 167 g (1.97 mol) of dichloromethane. After the solids dissolve, the solution is cooled to 4° C. 25.2 g (0.12 mol) of tetraethylammonium bromide and 25 g of deionized water are added to the addition funnel. 16.0 g (0.10 mol) of bromine is added, and rust red solids are produced. The solids are dissolved by adding 62 g of dichloromethane, resulting in a two-phase liquid system. The lower deep red layer is added to the reaction mixture over 8 minutes, resulting in an increase of the pot temperature to 6° C. The resulting mixture is heated to reflux in a warm water bath for 3.5 hours. A slurry forms, which is transferred to a 500-mL separatory funnel, using 64 g of dichloromethane and 100 g of water to aid the transfer and to dissolve the solids. After mixing thoroughly, the upper aqueous layer is removed and the lower organic layer is extracted once with 100 g of water, then again with 49 g of water. The washed organic solution is added over 2 minutes to a 2-L round bottom flask containing 519 g of rapidly stirring 2-propanol. The resulting slurry is filtered, and the solids are washed with 159 g of 2-propanol. The washed solids are tumble-dried in a 2-L round bottom flask using a rotary evaporator at 65° C./20 mm Hg (2.66 kPa) for 2 hours to yield 22.1 g of dull white solids.

Proton NMR also indicates that 92% of the butadiene units in the polymer are brominated. Weight average molecular weight is 133,080 and number average molecular weight is 128,250. Polydispersity is 1.04. 5% WLT is ~253° C.

EXAMPLE 7

To a 250-mL round-bottom flask equipped with overhead stirring, addition funnel, and a nitrogen inlet are added 9.0 g of the styrene/butadiene copolymer described in Example 1 (0.1 mol eq. of polybutadiene) and 66 g of dichloromethane. To a separate 250-mL round bottom flask are added 25.2 g (0.12 mol) of tetraethylammonium bromide and 41 g of deionized water. 16.0 g (0.10 mol) of bromine is added, which produces rust red solids and raises the temperature of the solution to 31° C. The solids are dissolved by adding 12 g of dichloromethane, resulting in a two-phase liquid system and raising the temperature further of the solution to 34° C. The two-phase solution is transferred to an addition funnel, using 16 g of dichloromethane to aid the transfer. The entire solution (both organic and aqueous layers) is added in one rapid addition to the polymer solution, raising the temperature of the polymer solution from 26° C. to 34° C. After 2 hours, a reaction aliquot is precipitated into 2-propanol, the resulting slurry is filtered, and the solids are washed with 2-propanol. After drying, the solid sample is analyzed by proton NMR, which shows 95.1% bromination of the double bonds.

EXAMPLE 8

A 47% styrene/53% butadiene block copolymer having a weight average molecular weight of 70,000, a number average molecular weight of 67,000 and 81% of its butadiene units being 1,2-butadiene units is brominated. 4 g of the copolymer and 20.3 g tetrabutylammonium tribromide are dissolved in 70 mL dichloromethane are mixed and refluxed for 4 hours. Toluene (30 mL) is added and the polymer solution washed with an aqueous sodium hydrogen sulfite solution. The resulting brominated copolymer is isolated from the modified solution by mixing the solution with five times its volume of methanol to precipitate the product. The precipitated brominated copolymer is recovered and re-dissolved in 100 mL toluene, washed with 50 mL water to remove any residual tetrabutylammonium bromide by-product, and again isolated by precipitation in methanol as before. The precipitated product is then recovered and dried. The 5% WLT of this product is 260° C.

EXAMPLE 9

A brominated poly(styrene/butadiene) triblock co-polymer (12.5 g) prepared in a manner similar to that described in the previous examples (and having a 5% weight loss temperature of 248° C.) and 1,2-dichloroethane (73.5 g) are charged to a 250-mL flass jar. After the copolymer has dissolved, a solution of 25% sodium methoxide in methanol (1.1 g) is added and the resulting murky white solution is stirred for approximately 1.5 hours. The solution is then poured into a mixture of 2-propanol (196 g) and water (25.8 g) to precipitate the treated copolymer. After mixing, the slurry is filtered through a coarse glass-fritted funnel, and the solids are washed with 2-propanol (78 g). The solids are dried to constant weight (11.9 g). The resulting product has a 5% weight loss temperature of 259° C.

What is claimed is:

1. A process comprising subjecting a reaction mixture including a) at least one tribromide brominating agent selected from a benzyltrialkylammonium tribromide, tetraethylammonium tribromide or tetrapropylammonium tribromide, b) at least one butadiene/vinyl aromatic copolymer containing from 5 to 90 percent by weight of polymerized vinyl aromatic monomer units and from 10 to 95 percent by weight of polymerized butadiene units, and a weight average molecular weight of at least 1000 and c) at least one solvent for the butadiene/vinyl aromatic copolymer, to conditions sufficient to brominate at least 50 percent of non-aromatic double bonds in the butadiene/vinyl aromatic copolymer.

2. The process of claim 1 wherein the solvent is a halogenated alkane, a cyclic alkane that contains no hydrogen atoms bonded to a tertiary carbon atom or a halogenated aromatic compound.

3. The process of claim 2 wherein at least 50% of the polymerized butadiene units in the copolymer are 1,2-butadiene units.

4. The process of claim 3 wherein the conditions include a temperature of from 0 to 85° C.

5. The process of claim 4 wherein the butadiene/vinyl aromatic copolymer is a styrene/butadiene block copolymer having a weight average molecular weight of from 1,000 to 400,000.

6. A process comprising adding bromine to a reaction mixture containing a) at least one monobromide salt selected from a phenyltrialkylammonium monobromide salt, benzyltrialkylammonium monobromide salt or tetraalkylammonium monobromide salt, b) at least one butadiene/vinyl aromatic copolymer containing from 5 to 90 percent by weight of polymerized vinyl aromatic monomer units and from 10 to 95 percent by weight of polymerized butadiene units, and a weight average molecular weight of at least 1000 and c) at least one solvent for the butadiene/vinyl aromatic copolymer, and subjecting the resulting blend to conditions sufficient to brominate at least 50 percent of non-aromatic double bonds in the butadiene/vinyl aromatic copolymer.

7. The process of claim 1, further comprising contacting the brominated copolymer with an alkali metal base.

8. The process of claim 7, wherein the alkali metal base is an alkali metal alkoxide.

9. The process of claim 8, wherein from 0.05 to 0.20 mole of the alkali metal alkoxide is contacted with the brominated copolymer per mole of repeating brominated or unbrominated butadiene units in the copolymer.

10. The process of claim 6 wherein the butadiene/vinyl aromatic copolymer is fed continuously or intermittently to the reaction mixture.

11. A process comprising blending bromine with a reaction mixture containing a) at least one monobromide salt selected from a phenyltrialkylammonium monobromide salt, benzyltrialkylammonium monobromide salt or tetraalkylammonium monobromide salt, b) at least one butadiene/vinyl aromatic copolymer containing from 5 to 90 percent by weight of polymerized vinyl aromatic monomer units and from 10 to 95 percent by weight of polymerized butadiene units, and a weight average molecular weight of at least 1000 and c) at least one solvent for the butadiene/vinyl aromatic copolymer, said blending step being performed under conditions sufficient to brominate non-aromatic double bonds in the butadiene/vinyl aromatic copolymer.

12. The process of claim 11 wherein the bromine is blended continuously or intermittently with the reaction mixture.

13. A process comprising blending bromine with a reaction mixture containing a) at least one monobromide salt selected from a phenyltrialkylammonium monobromide salt, benzyltrialkylammonium monobromide salt or tetraalkylammonium monobromide salt, b) at least one butadiene/vinyl aromatic copolymer containing from 5 to 90 percent by weight of polymerized vinyl aromatic monomer units and from 10 to 95 percent by weight of polymerized butadiene units, and a weight average molecular weight of at least 1000 and c) at least one solvent for the butadiene/vinyl aromatic coolymer, said blending step being performed under conditions sufficient to brominate non-aromatic double bonds in the butadiene/vinyl aromatic copolymer wherein the bromine is blended continuously or intermittently with the reaction mixture and the butadiene/vinyl aromatic copolymer is fed continuously or intermittently to the reaction mixture.

14. The process of claim 13 wherein the brominated butadiene/vinyl aromatic copolymer precipitates from the reaction mixture or is continuously or intermittently removed from the reaction mixture.

15. A process comprising continuously feeding a solution of tetraethylammonium tribromide in a reaction solvent and a butadiene/vinyl aromatic copolymer dissolved in the reaction solvent to a continuous reactor where they are mixed and react to form a brominated butadiene/vinyl aromatic copolymer and tetraethylammonium monobromide, wherein the tetraethylammonium monobromide is continuously recycled and bromine is added to recycled tetraethylammonium monobromide in the presence of continuously added reaction solvent to regenerate the tetraethylammonium tribromide.

* * * * *

UNITED STATES PATENT AND TRADEMARK OFFICE
CERTIFICATE OF CORRECTION

PATENT NO. : 8,202,945 B2
APPLICATION NO. : 12/375679
DATED : June 19, 2012
INVENTOR(S) : Bruce A. King et al.

It is certified that error appears in the above-identified patent and that said Letters Patent is hereby corrected as shown below:

Title page, Item (54) and Col. 1, Title of the invention needs to be corrected from
PROCESS FOR BROMINATING BUTADIENE<u>N</u>INYL AROMATIC COPOLYMERS
to
PROCESS FOR BROMINATING BUTADIENE<u>/</u>VINYL AROMATIC COPOLYMERS Signed and Sealed this
Fourth Day of December, 2012

David J. Kappos
*Director of the United States Patent and Trademark Office*